(12) United States Patent
Mihály et al.

(10) Patent No.: US 11,940,976 B2
(45) Date of Patent: Mar. 26, 2024

(54) TECHNIQUE FOR CONCURRENCY CONTROL

(71) Applicant: Telefonaktiebolaget LM Ericsson (PUBL), Stockholm (SE)

(72) Inventors: Attila Mihály, Dunakeszi (HU); Maria Cruz Bartolome Rodrigo, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 310 days.

(21) Appl. No.: 17/293,149

(22) PCT Filed: Jan. 16, 2019

(86) PCT No.: PCT/EP2019/051002
§ 371 (c)(1),
(2) Date: May 12, 2021

(87) PCT Pub. No.: WO2020/126106
PCT Pub. Date: Jun. 25, 2020

(65) Prior Publication Data
US 2022/0012226 A1    Jan. 13, 2022

(30) Foreign Application Priority Data

Dec. 17, 2018   (EP) ..................................... 18382932

(51) Int. Cl.
*G06F 16/23*   (2019.01)
*G06F 9/52*    (2006.01)
*G06N 5/04*    (2023.01)

(52) U.S. Cl.
CPC ............ *G06F 16/2343* (2019.01); *G06F 9/52* (2013.01); *G06N 5/04* (2013.01)

(58) Field of Classification Search
CPC .... G06F 16/2343; G06F 9/52; G06F 16/2308; G06N 5/04
See application file for complete search history.

(56) References Cited

U.S. PATENT DOCUMENTS

2009/0300017 A1* 12/2009 Tokusho ............. G06F 16/2343
2016/0350357 A1* 12/2016 Palmer ................ G06F 16/2315

FOREIGN PATENT DOCUMENTS

WO     2018 224169 A1    12/2018

OTHER PUBLICATIONS

ETSI TS 123 501 v15.3.0; 5G; System Architecture for the 5G System (3GPP TS 23.501 version 15.3.0 Release 15)—Sep. 2018.

(Continued)

*Primary Examiner* — Etienne P Leroux
*Assistant Examiner* — Cindy Nguyen
(74) *Attorney, Agent, or Firm* — BAKER BOTTS L.L.P.

(57) ABSTRACT

A technique for concurrency control of transactions in a system comprising a plurality of application instances accessing a database system is provided. A method implementation of the technique is performed by the database system and comprises receiving (S502) a first transaction start request indicating a start of a first transaction to lock first data stored in the database system against access requests not belonging to the first transaction while the first transaction is ongoing, receiving (S504) a second transaction start request indicating a start of a second transaction to lock second data stored in the database system against access requests not belonging to the second transaction while the second transaction is ongoing, the second data at least partly overlapping with the first data, receiving (S506) an access request to at least a portion of the second data that overlaps with the first data while the first transaction and the second transaction are ongoing, the access request belonging to the second transaction, and controlling (S508) acceptance of the access request based on determining whether the second transaction has a higher priority than the first transaction.

19 Claims, 10 Drawing Sheets

(56) References Cited

OTHER PUBLICATIONS

ETSI TS 123 502 v15.3.0; 5G; Procedures for the 5G System (3GPP TS 23.502 version 15.3.0 Release 15)—Sep. 2018.
PCT International Search Report issued for International application No. PCT/EP2019/051002—dated Feb. 22, 2019.
PCT Written Opinion of the International Searching Authority issued for International application No. PCT/EP2019/051002—dated Feb. 22, 2019.

* cited by examiner

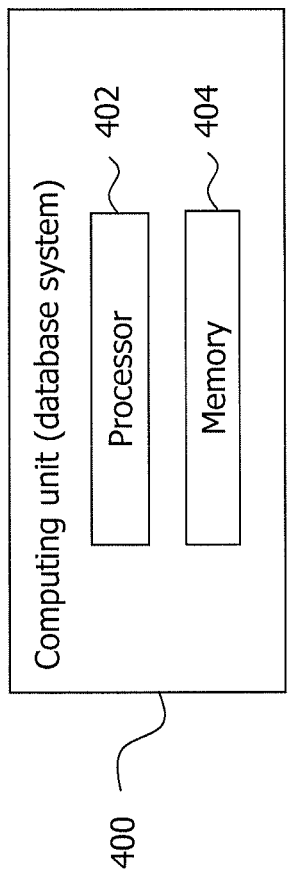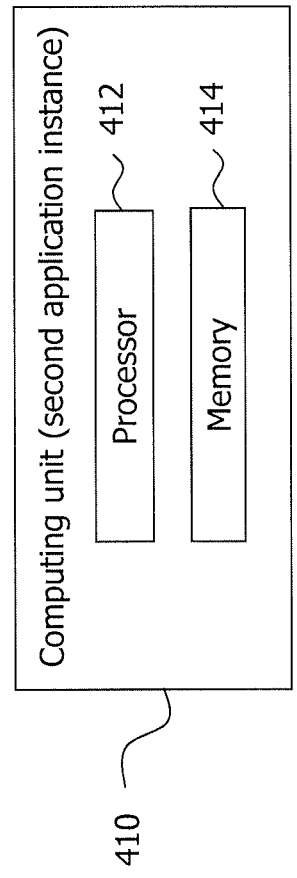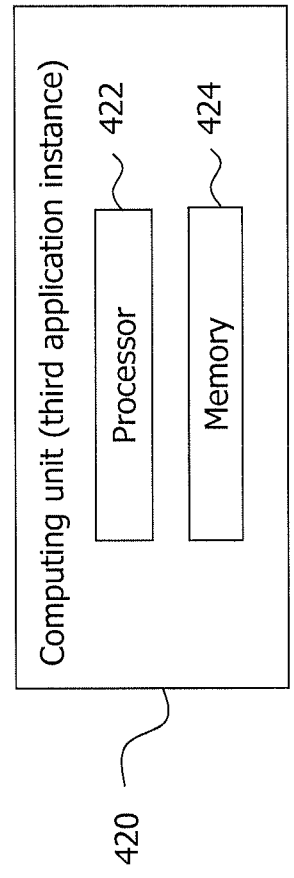

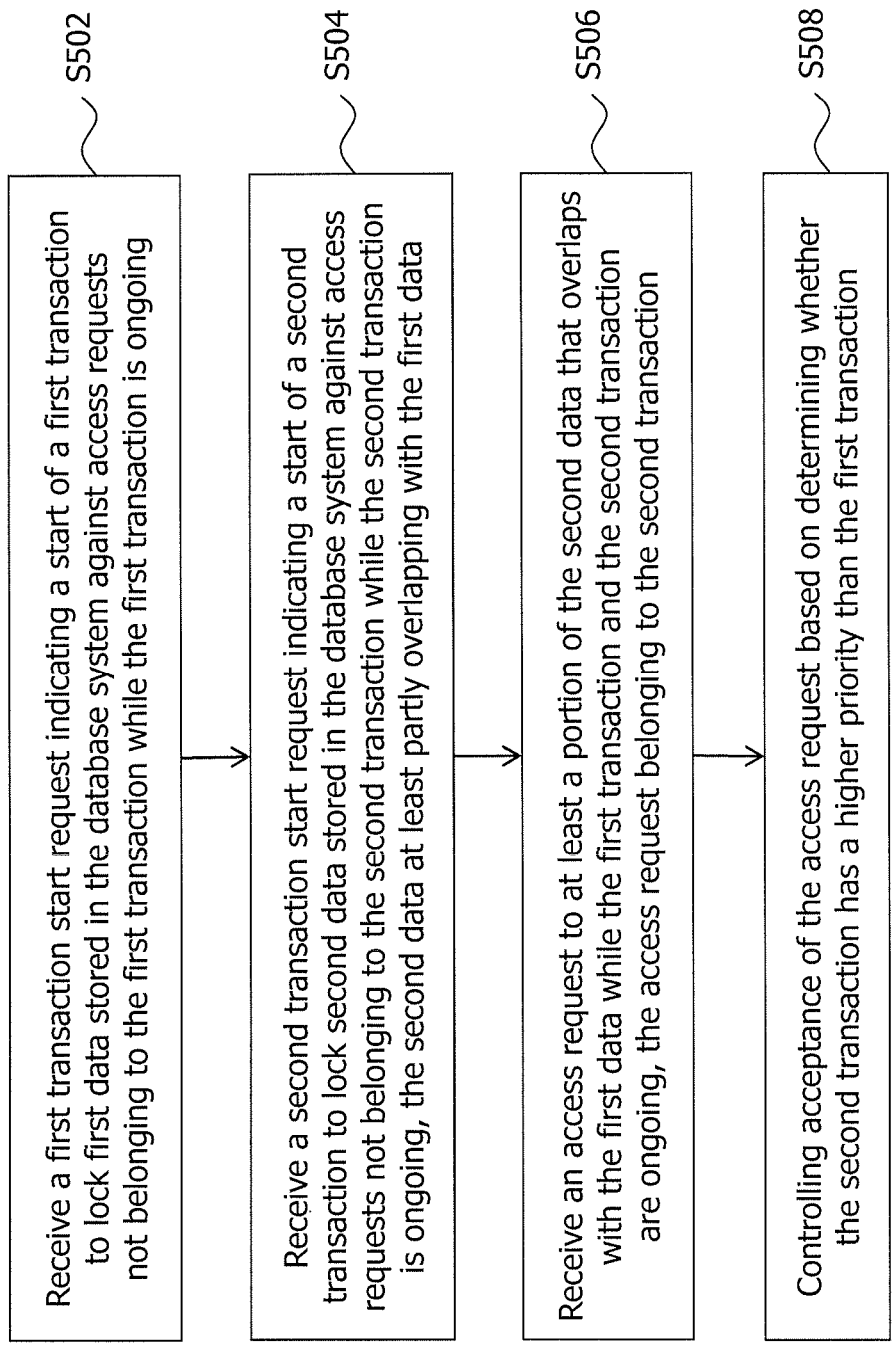

TECHNIQUE FOR CONCURRENCY CONTROL

PRIORITY

This nonprovisional application is a U.S. National Stage Filing under 35 U.S.C. § 371 of International Patent Application Serial No. PCT/EP2019/051002 filed Jan. 16, 2019 and entitled "Technique for Concurrency Control" which claims priority to European Patent Application No. 18382932.4 filed Dec. 17, 2018 both of which are hereby incorporated by reference in their entirety.

TECHNICAL FIELD

The present disclosure generally relates to the field of concurrent computing. In particular, a technique for concurrency control of transactions in a system comprising a plurality of application instances accessing a database system is presented. The technique may be embodied in methods, computer programs, apparatuses and systems.

BACKGROUND

In next generation (5G) mobile communication networks, there is a general trend that network architectures are built around the Service Based Architecture (SBA) paradigm, which means that there will be network domains, such as the Core Network (CN), in which functional components are defined as "services", i.e., self-contained functionalities, that can be modified in an isolated manner (without affecting others). Services will likely be built in a stateless way, i.e., the application logic of the services and the data context will be separated, which means that the services will typically store their context externally in proprietary databases. While such architectures will enable a variety of cloud infrastructure features, like auto-scaling or auto-healing, the stateless nature of the services also implies that multiple instances of the same or different services may need to simultaneously access the same data, potentially resulting in race conditions. If suitable concurrency control among these accesses is not provided, inconsistent states across the system may be the consequence, e.g., due to overwriting of data that has been updated by other instances. An example is when certain session management actions (e.g., session establishment or session modification) that require changes to the session context of a User Equipment (UE) are ongoing and when a handover occurs at the same time for the same UE impacting the same user path.

Various techniques for concurrency control dealing with such situations are generally known. One such technique is strict locking (also known as explicit locking), where explicit locks are employed to handle race conditions. An example of such technique is shown in FIG. 1, in which an instance X of a service A is granted exclusive access (read, write or both) to a record R stored in a UE context database C, wherein other service instances, such as an instance Y (which may be an instance of the same service A or an instance of another service B requiring access to the same record R), will be blocked when attempting to access the record R until the lock is released by the instance holding it, i.e., instance X.

Another technique is optimistic locking (also known as opportunistic concurrency control (OCC)) which is generally based on the assumption that multiple transactions can frequently complete without interfering each other. Using OCC, while running, transactions may use data resources without acquiring locks on those resources. Before committing, each transaction verifies that no other transaction has modified the data it has read, wherein it may be required that any OCC write transaction is preceded by a read operation for the same set of data. As shown in the example of FIG. 2, in one variant, the database may generate and send a token (which can be a timestamp of the latest update of record R, for example) to the instance that reads the record R and each committing transaction is then required to send this token in any update request. If there is a subsequent write to the record R, the token is updated (invalidated) and, therefore, all further attempts to update the record R using an invalid token reveals conflicting modifications and will consequently fail. In these cases, the committing transaction rolls back and may be restarted.

Although such techniques for concurrency control have proven their suitability in certain scenarios, they may suffer from their drawbacks in other scenarios. Strict locking, for example, may be a long and expensive operation, especially if it is used for complex transactions. In mobile communication networks, such as 5G networks, a procedure that involves multiple interactions between different entities or services in the CN typically requires multiple database accesses (both reads and writes) from different entities. Such transactions are successful if all database updates involved succeed. If strict locking is used, it is necessary that the updating entity sends an exclusive lock request for the related attributes/records at the beginning of the transaction and keeps the lock as long as the last database update is completed. This means, however, that no other entity has access to that data until the update is terminated, which may take a long time in case of complex procedures. This also includes other instances of the same service that may be required to participate in the same transaction, which cannot participate because of the exclusive lock. As a resolution, complicated mechanisms may be required to redirect messages within the same transaction to the entity that locks the database.

OCC, on the other hand, is a faster method and may be suitable for use in mobile communication networks, in which data contention among different transactions is generally low. However, OCC may not be suitable in case of complex transactions with multiple database updates either. For example, if a database update is invalid during the transaction, all previous and successful database transactions would have to be rolled back. This rollback can be complex to implement, because, on the one hand, inferring what should be rolled back by the updating service instance may be cumbersome (several instances may have been involved and what should be rolled back may generally depend on the functional logic of the instances) and, on the other hand, even some decisions may have already been made based on previous interactions that are optimistically considered to be successful. Another problem related to the rollback of multi-step transactions is that OCC may result in starving concurrent transactions. This may happen when an update is invalidated in one transaction, which initiates a rollback and restart. During this rollback event (which may also involve database updates for previously successful transactions), a step of another transaction that is still ongoing may also get an invalidation for its updates and start to roll back as well.

An additional problem related to database transactions, that applies to both strict locking and OCC, may occur when whole attribute ranges are read. If the value of any of these attributes changes, race condition handling affecting the ongoing transactions is typically triggered even if the changed values do not modify the outcome of other procedures that run in parallel. In such cases, it may be beneficial if race condition handling is not triggered.

A still further problem may arise in situations which involve preemption or prioritization among the transactions being performed. Such situations may especially occur in 5G networks, where the preemption or prioritization characteristics of 5G network procedures may not necessarily be alike. For example, some 5G procedures may be more important to terminate, whereas others may not have strict time constraints. Also, some procedures may have a relatively higher or lower priority compared to others. As an example, a handover procedure may be more important to terminate than a Protocol Data Unit (PDU) session creation or PDU session modification procedure to make sure that corresponding bearers are set up or modified on the new path relating to the target base station. Another example, which relates to the preemption of a UE-side service request over a paging procedure, is illustrated in FIG. 3. As shown in the figure, if a service request comes in from a UE before a Radio Access Network (RAN) initiated paging procedure to wake up the same UE is completed, the paging is not necessary any longer and can therefore be canceled. Other examples relate to preemption of emergency calls or signaling concerning mission critical applications that should be prioritized over regular traffic. Current techniques for concurrency control do not support such prioritization or preemption features, however.

SUMMARY

Accordingly, there is a need for a technique for concurrency control that avoids one or more of the problems discussed above, or other problems.

According to a first aspect, a method for concurrency control of transactions in a system comprising a plurality of application instances accessing a database system is provided. The method is performed by the database system and comprises receiving a first transaction start request indicating a start of a first transaction to lock first data stored in the database system against access requests not belonging to the first transaction while the first transaction is ongoing, receiving a second transaction start request indicating a start of a second transaction to lock second data stored in the database system against access requests not belonging to the second transaction while the second transaction is ongoing, the second data at least partly overlapping with the first data, receiving an access request to at least a portion of the second data that overlaps with the first data while the first transaction and the second transaction are ongoing, the access request belonging to the second transaction, and controlling acceptance of the access request based on determining whether the second transaction has a higher priority than the first transaction.

Controlling acceptance of the access request may include one of accepting the access request when the second transaction has a higher priority than the first transaction and rejecting the access request when the second transaction has a lower priority than the first transaction. The first transaction start request may include a priority indication for the first transaction and the second transaction start request may include a priority indication for the second transaction, wherein determining whether the second transaction has a higher priority than the first transaction may include checking whether the priority indication of the second transaction has a higher priority than the priority indication of the first transaction. Locking the first data may include marking the first data by the priority indication of the first transaction and locking the second data may include marking the second data by the priority indication of the second transaction, wherein, prior to determining whether the second transaction has a higher priority than the first transaction, the priority indication of the first transaction and the priority indication of the second transaction may be retrieved based on the marking of the at least a portion of the second data to be accessed by the access request.

Determining whether the second transaction has a higher priority than the first transaction may also include inferring a priority value for the first transaction based on information received as part of the first transaction and inferring a priority value for the second transaction based on information received as part of the second transaction, and checking whether the priority value of the second transaction is higher than the priority value of the first transaction. Each of the information received as part of the first transaction and the information received as part of the second transaction may include at least one of a transaction identifier of the respective transaction, a transaction name of the respective transaction, data being accessed as part of the respective transaction, a type of request being performed as part of the respective transaction, and a type of service as part of which the respective transaction is performed. Inferring the priority value of the first transaction and inferring the priority value of the second transaction may be performed based on a predetermined configuration of the database system.

The method may further comprise tracking modifications applied to the first data in response to access requests performed as part of the first transaction and rolling back the first transaction based on the tracked modifications when it is determined that second transaction has a higher priority than the first transaction. The system may be a mobile communication system and the database system may be a central database system employed in the mobile communication system.

According to a second aspect, a method for concurrency control of transactions in a system comprising a plurality of application instances accessing a database system is provided. The method is performed by an application instance of the plurality of application instances and comprises triggering sending, to the database system, a second transaction start request indicating a start of a second transaction to cause the database system to lock second data stored in the database system against access requests not belonging to the second transaction while the second transaction is ongoing, the second data at least partly overlapping with first data being locked by the database system against access requests not belonging to an ongoing first transaction, wherein the second transaction start request includes a priority indication for the second transaction enabling the database system to control acceptance of access requests to the data belonging to the second transaction based on determining whether the second transaction has a higher priority than the first transaction.

The method according to the second aspect defines a method from an application instance's perspective which may be complementary to the method according to the first aspect. As such, those aspects described with regard to the method of the first aspect which are applicable to the method of the second aspect may be comprised by the method of the second aspect as well, and vice versa. As in the method of the first aspect, the system may be a mobile communication system and the database system may be a central database system employed in the mobile communication system.

According to a third aspect, a method for concurrency control of transactions in a system comprising a plurality of application instances accessing a database system is provided. The method is performed by an application instance of the plurality of application instances and comprises triggering sending, to the database system, an access request to at least a portion of second data stored in the database system, the access request belonging to an ongoing second transaction and the second data being locked by the database system against access requests not belonging to the second transaction, the second data at least partly overlapping with first data being locked by the database system against access requests not belonging to an ongoing first transaction.

The method according to the third aspect defines a method from an application instance's perspective which may be complementary to the method according to the first aspect. As such, those aspects described with regard to the method of the first aspect which are applicable to the method of the third aspect may be comprised by the method of the third aspect as well, and vice versa. In accordance with the method of the first aspect, the method may comprise one of receiving, from the database system, an acceptance of the access request when the second transaction has a higher priority than the first transaction and receiving, from the database system, a rejection of the access request when the second transaction has a lower priority than the first transaction. The method may further comprise triggering terminating, upon receiving a rejection of the access request, a service as part of which the access request was sent to the database system. The system may be a mobile communication system and the database system may be a central database system employed in the mobile communication system.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, a computing unit configured to execute a database system for concurrency control of transactions in a system comprising a plurality of application instances accessing the database system is provided. The computing unit comprises at least one processor and at least one memory, the at least one memory containing instructions executable by the at least one processor such that the database system is operable to perform any of the method steps presented herein with respect to the first aspect.

According to a sixth aspect, a computing unit configured to execute an application instance for concurrency control of transactions in a system comprising a plurality of application instances accessing a database system is provided. The computing unit comprises at least one processor and at least one memory, the at least one memory containing instructions executable by the at least one processor such that the application instance is operable to perform any of the method steps presented herein with respect to the second aspect.

According to a seventh aspect, a computing unit configured to execute an application instance for concurrency control of transactions in a system comprising a plurality of application instances accessing a database system is provided. The computing unit comprises at least one processor and at least one memory, the at least one memory containing instructions executable by the at least one processor such that the application instance is operable to perform any of the method steps presented herein with respect to the third aspect.

According to an eighth aspect, there is provided a system comprising a computing unit of the fifth aspect, a computing unit of the sixth aspect and a computing unit of the seventh aspect.

BRIEF DESCRIPTION OF THE DRAWINGS

Implementations of the technique presented herein are described herein below with reference to the accompanying drawings, in which:

FIGS. 4a to 4c illustrate exemplary compositions of a computing unit configured to execute a database system, a computing unit configured to execute a second application instance, and a computing unit configured to execute a third application instance according to the present disclosure;

FIG. 5 illustrates a method which may be performed by the database system according to the present disclosure;

DETAILED DESCRIPTION

Figure 1:
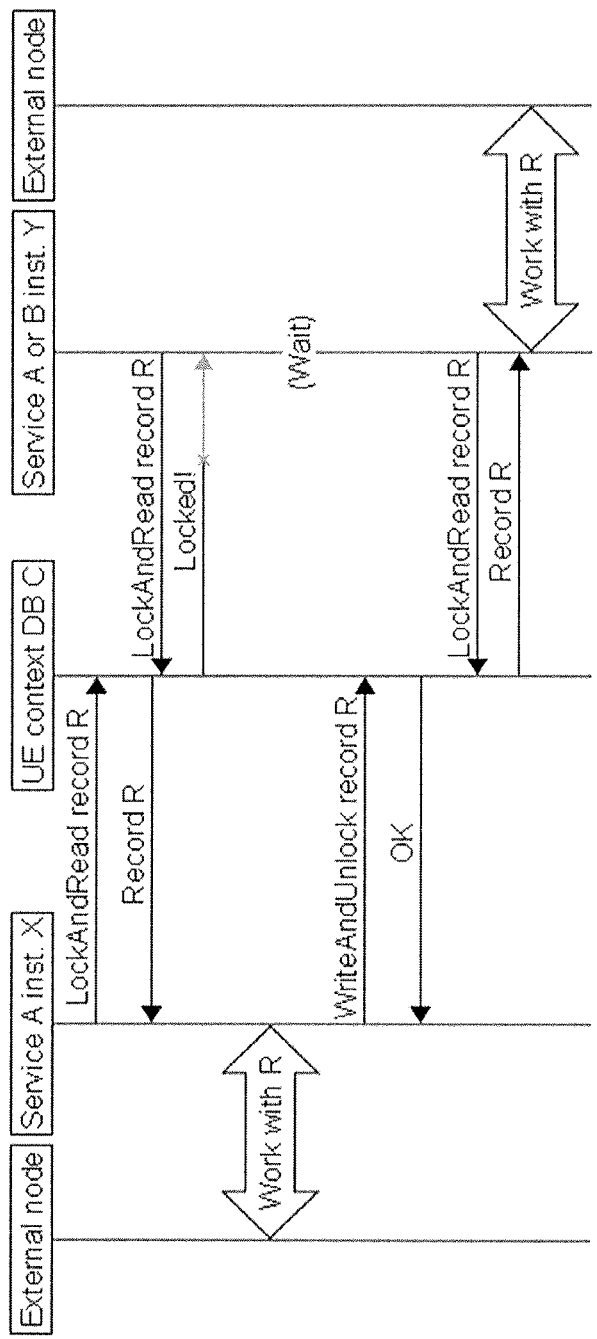
FIG. 1 illustrates a signaling diagram exemplifying the use of strict locking.
Figure 2:
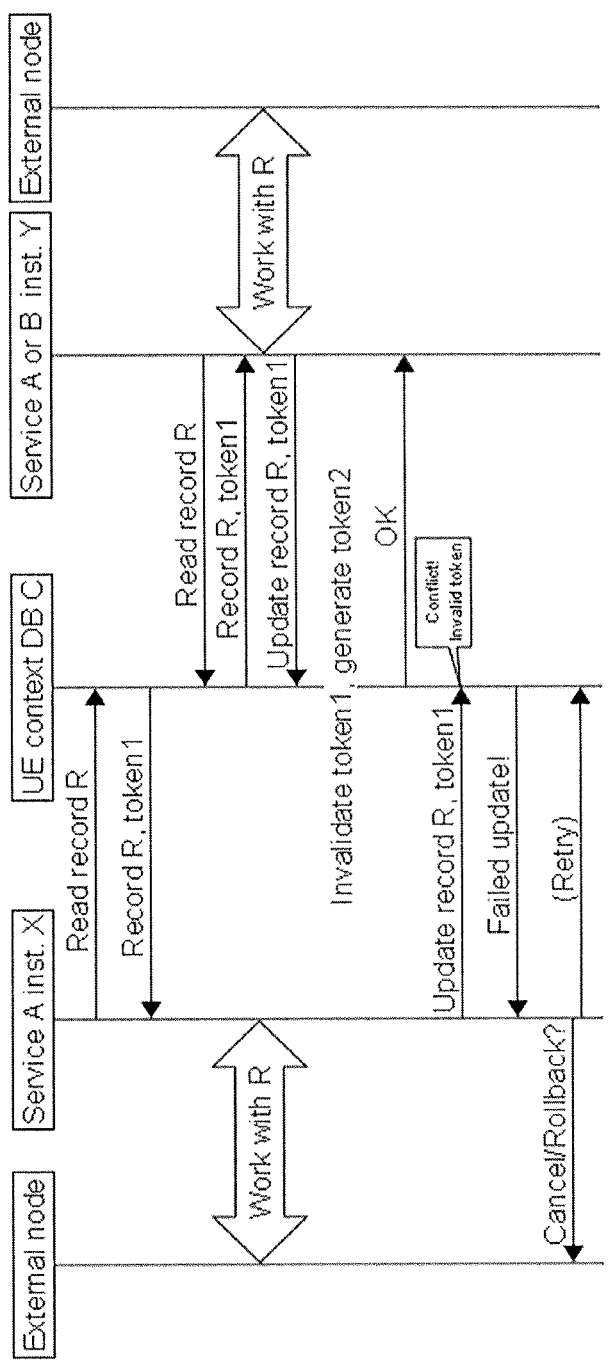
FIG. 2 illustrates a signaling diagram exemplifying the use of OCC.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 4a schematically illustrates an exemplary composition of a computing unit 400 configured to execute a database system for concurrency control of transactions in a system comprising a plurality of application instances accessing the database system. The computing unit 400 comprises at least one processor 402 and at least one memory 404, wherein the at least one memory 404 contains instructions executable by the at least one processor 402 such that the database system is operable to carry out the method steps described herein below with reference to the database system.

FIG. 4b schematically illustrates an exemplary composition of a computing unit 410 configured to execute a second application instance for concurrency control of transactions in a system comprising a plurality of application instances accessing a database system. The computing unit 410 comprises at least one processor 412 and at least one memory 414, wherein the at least one memory 414 contains instructions executable by the at least one processor 412 such that the second application instance is operable to carry out the method steps described herein below with reference to the "second application instance".

FIG. 4c schematically illustrates an exemplary composition of a computing unit 420 configured to execute a third application instance for concurrency control of transactions in a system comprising a plurality of application instances accessing a database system. The computing unit 420 comprises at least one processor 422 and at least one memory 424, wherein the at least one memory 424 contains instructions executable by the at least one processor 422 such that the third application instance is operable to carry out the method steps described herein below with reference to the "third application instance".

It will be understood that each of the computing unit 400, the computing unit 410 and the computing unit 420 may be implemented on a physical computing unit or a virtualized computing unit, such as a virtual machine, for example. It will further be appreciated that each of the computing unit 400, the computing unit 410 and the computing unit 420 may not necessarily be implemented on a standalone computing unit, but may be implemented as components—realized in software and/or hardware—residing on multiple distributed computing units as well, such as in a cloud computing environment, for example.

FIG. 5 illustrates a method which may be performed by the database system executed on the computing unit 400 according to the present disclosure. The method is dedicated to performing concurrency control of transactions in a system comprising a plurality of application instances accessing the database system. In step S502, the database system may receive a first transaction start request indicating a start of a first transaction to lock first data stored in the database system against access requests not belonging to the first transaction while the first transaction is ongoing. In step S504, the database system may receive a second transaction start request indicating a start of a second transaction to lock second data stored in the database system against access requests not belonging to the second transaction while the second transaction is ongoing, the second data at least partly overlapping with the first data. In step S506, the database system may receive an access request to at least a portion of the second data that overlaps with the first data while the first transaction and the second transaction are ongoing, the access request belonging to the second transaction. In step S508, the database system may control acceptance of the access request based on determining whether the second transaction has a higher priority than the first transaction.

The plurality of application instances accessing the database system may comprise instances of one or more applications. The plurality of application instances may access the database system concurrently so that transactions may be used to handle race conditions occurring when the database system is accessed. The database system may correspond to a database management system (DBMS), for example, but is not limited thereto, and it will be understood that the database system may generally correspond to any other application logic that is executed on a layer on top of a database. Each transaction may comprise one or more access requests (e.g., read and/or write requests) to the database system, wherein each of the one or more access requests may be performed by one of the plurality of application instances. The access requests of a transaction may not necessarily originate from the same application instance and, rather, the one or more access requests may comprise access requests from different application instances among the plurality of application instances (possibly even from instances of different types of applications). A transaction may be considered successful if all of the one or more access requests are successful themselves, e.g., without occurrence of side effects caused by race conditions.

A first transaction may be initiated, in accordance with step S502, by a first transaction start request indicating the start of the first transaction and causing the database system to lock first data stored in the database system against access requests not belonging to the first transaction while the first transaction is ongoing. The first transaction request may be received from a first application instance of the plurality of application instances. Rather than locking the first data exclusively by the first application instance from which the first transaction start request is received, the first data may thus be locked based on the first transaction itself, so that acceptance of an access request to at least a portion of the first data may be controlled based on checking whether the access request belongs to the ongoing first transaction or not. In this way, the locking and granting of access to the first data may be managed by the database system itself, so that the lock may be exclusive to the first transaction but not exclusive to the first application instance that requested to lock (as it is the case in the strict locking technique described above, for example).

A second transaction may be initiated, in accordance with step S504, by a second transaction start request indicating the start of the second transaction and causing the database system to lock second data stored in the database system against access requests not belonging to the second transaction while the second transaction is ongoing. The second transaction request may be received from a second application instance (e.g., the second application instance executed on the computing unit 410) of the plurality of application instances, wherein the second application instance may (but does not necessarily have to) be different from the first application instance. Similar to the first data, rather than locking the second data exclusively by the second application instance from which the second transaction start request is received, the second data may be locked based on the second transaction itself, so that acceptance of an access request to at least a portion of the second data may be controlled based on checking whether the access request belongs to the ongoing second transaction or not.

In order to identify whether the access request, as received in step S506, belongs to the ongoing first or second transaction, each of the first transaction and the second transaction may be assigned a transaction identifier and the access request may include a transaction identifier itself that may be checked on a match with the transaction identifier of the respective ongoing transaction. In one variant, the first transaction start request may thus include a first transaction identifier uniquely identifying the first transaction, the second transaction start request may include a second transaction identifier uniquely identifying the second transaction, and the access request may include a third transaction identifier indicating a transaction to which the access request belongs. Generally, it may be checked whether the access request belongs to one of the first transaction and the second transaction based on comparing the third transaction identifier with the first and second transaction identifier. Upon a match of the third transaction identifier with the first transaction identifier, it may be determined that the access request belongs to the first transaction and, upon a match of the third transaction identifier with the second transaction identifier, it may be determined that the access request belongs to the second transaction.

The access request received in step S506 may be received from a third application instance (e.g., the third application instance executed on the computing unit 420) of the plurality of application instances. As the lock of the first data and the second data may not be exclusive to the respective application instance which requested the transaction, but may rather be exclusive to the respective transaction itself, as described above, the third application instance may (but does not necessarily have to) be different from the first application instance and/or the second application instance which requested the first transaction and the second transaction, respectively. The third application instance and the first and/or second application instance may even be instances of different types of applications, for example.

Controlling acceptance of an access request may include one of accepting the access request when the access request belongs to one of the first transaction and the second transaction and rejecting the access request when the access request does not belong to one of the first transaction and the second transaction. As the access request received in step S506 belongs to the second transaction, the third transaction identifier may match the second transaction identifier and—from a mere consideration of the transaction identifiers—the access request may thus be accepted. However, as the access request is directed to accessing at least a portion in of the second data that overlaps with the first data (in accordance with step S506) and the overlapping portion may already be locked by the first transaction (i.e., when the first transaction start request was received prior to the second transaction start request, so that the first data is already locked by the first transaction before the second transaction begins and the first transaction thus has precedence over the second transaction), the access request may nevertheless be rejected due to the precedence of the first transaction over the second transaction.

In case of preemption or prioritization among different services or transactions, as described above, however, it may be beneficial to avoid such strict precedence (i.e., precedence arising from the temporal order of the started transactions) among the first transaction and the second transaction. According to the technique presented herein, the first transaction and the second transaction may thus be assigned with corresponding priority values which enable breaking through such precedence and controlling acceptance of the access request based on determining whether one transaction has a higher priority than the other, even though the other transaction may have started been earlier. Controlling acceptance of the access request in accordance with step S508 may thus include one of accepting the access request when the second transaction has a higher priority than the first transaction and rejecting the access request when the second transaction has a lower priority than the first transaction.

The database system may store the first transaction identifier and the second transaction identifier upon receipt of the first transaction start request and the second transaction start request for later comparison with transaction identifiers included in subsequent access requests. In one implementation, with respect to the second transaction, the second transaction identifier may be stored in association with the second data to be locked so that, when at least a portion of the second data is attempted to be accessed by an access request, it may be checked whether the transaction identifier included in the access request matches the second transaction identifier stored in association with the second data. In other words, locking the second data may include marking the second data by the second transaction identifier, wherein, prior to comparing the third transaction identifier and the second transaction identifier, the second transaction identifier may be retrieved based on the marking of the at least a portion of the second data to be accessed by the access request. The same may apply to the first transaction together with the first transaction identifier and the first data.

As said, in order to identify whether the second transaction has a higher priority than the first transaction, each of the first transaction and the second transaction may be assigned a priority value. In order to determine a corresponding priority value, in one variant, the first transaction start request may include a priority indication for the first transaction and the second transaction start request may include a priority indication for the second transaction, wherein determining whether the second transaction has a higher priority than the first transaction may include checking whether the priority indication of the second transaction has a higher priority than the priority indication of the first transaction. The priority indication of each of the first transaction second transaction may correspond to a priority value that is selected from a predetermined range of priority values, such as integer values from 1 to 10, for example.

Similar to the first and second transaction identifiers, the database system may also store the priority indication for the first transaction and the priority indication for the second transaction upon receipt of the first transaction start request and the second transaction start request for later comparison. In one implementation, with respect to the second transaction, the priority indication for the second transaction may be stored in association with the second data to be locked so that, when at least a portion of the second data is attempted to be accessed by an access request, it may be checked whether the priority indication for the second transaction is higher or lower than the priority indication of the transaction to which the access request belongs. The same may apply to the first transaction together with the priority indication for the first transaction and the first data. Locking the first data may thus include marking the first data by the priority indication of the first transaction and locking the second data may include marking the second data by the priority indication of the second transaction, wherein, prior to determining whether the second transaction has a higher priority than the first transaction, the priority indication of the first transaction and the priority indication of the second transaction may be retrieved based on the marking of the at least a portion of the second data to be accessed by the access request.

In another variant, in which no dedicated priority indications are received by the database system, determining whether the second transaction has a higher priority than the first transaction may include inferring a priority value for the first transaction based on information received as part of the first transaction and inferring a priority value for the second transaction based on information received as part of the second transaction, and checking whether the priority value of the second transaction is higher than the priority value of the first transaction. Each of the information received as part of the first transaction and the information received as part of the second transaction may include at least one of a transaction identifier of the respective transaction, a transaction name of the respective transaction, data being accessed as part of the respective transaction, a type of request being performed as part of the respective transaction, and a type of service as part of which the respective transaction is performed. Among this information, the transaction identifier and/or the transaction name may be used to identify the respective transaction and the data being accessed, the type of request and/or the type of service may be used as additional information to infer the respective priority value, for example. The transaction name of the respective transaction may be named after a service as part of which the respective transactions performed, in which case the presence of an additional identifier (e.g., the transaction identifier) may be required in order to be able to distinguish multiple instances of the same service being executed in parallel. The prioritization order may generally be subject to a configuration in the database system or, in other words, inferring the priority value of the first transaction and inferring the priority value of the second transaction may be performed based on a predetermined configuration of the database system.

In case the access request belonging to the second transaction is accepted due to the second transaction having a higher priority than the first transaction, it may be required that modifications to the first data (which may have been applied as part of the first transaction until the acceptance of the access request) are rolled back to the state of the first data at the start of the first transaction. In this case, all values of the first data which have been modified during the first transaction may need to be returned to their original values at the start of the first transaction. The database system may for this purpose track what is modified along the first transaction and keep the respective values prior to their first modification for potential recovery. The method may thus further comprise tracking modifications applied to the first data in response to access requests performed as part of the first transaction and rolling back the first transaction based on the tracked modifications when it is determined that the second transaction has a higher priority than the first transaction (i.e., when the access request belonging to the second transaction has been accepted). Such recovery may generally be done by the database system whenever a transaction that has undergone updates of its locked data is to be invalidated due to a preemption or prioritization of another transaction, for example.

The access request may generally correspond to a read request or a write request. Since only write requests may be capable of causing inconsistencies in the locked data upon the occurrence of race conditions, the lock may apply to write requests only. The access request belonging to the second transaction may thus be a write request, wherein read requests to the first and second data from any one of the plurality of application instances may be accepted independently of whether the read requests belong to the first transaction and/or the second transaction.

Data to be locked by a transaction (e.g., the first transaction or the second transaction) may be specified in different ways. In one variant, the data to be locked may be specified upon request when sending the corresponding transaction start request, e.g., the transaction start request may include an indication of the data to be locked while the transaction is ongoing. In another variant, which may be alternative or additional to the previous variant, the data to be locked may be marked upon every database access that is performed as part of the ongoing transaction, e.g., the data to be locked may comprise data that is subject to read requests performed as part of the ongoing transaction. In one particular such variant, the first read request may be given by the transaction start request itself, i.e., the transaction start request may correspond to an initial read request performed as part of the transaction. The data to be locked may comprise one or more records and, in one particular variant, the data to be locked may comprise one or more attributes of a record of the database system. In such a variant, only specific attributes to be accessed by the access request which may be subject to a potential race condition may be marked to be locked. The one or more attributes of the record may thus correspond to a subset of attributes among a plurality of attributes of the record, wherein the subset of attributes includes attributes which are identified as attributes which may be subject to a race condition in the ongoing transaction. In this way, control may be limited to a minimum set of attributes, which may be expedient since, in a database access, many attributes may generally be updated at once, but only a few attributes may need to be controlled for potential race conditions with other transactions. The attributes which may be subject to a race condition in the ongoing transaction may be identified from the application logic of the application instance which sent the transaction start request, for example.

When locked data is to be released for a transaction (e.g., the first transaction or the second transaction), the database system may receive a corresponding transaction end request indicating an end of the transaction. Upon receipt of the transaction end request, the database system may release the lock from the data. The transaction end request may be received from one of an application instance which sent a transaction start request and an application instance which sent an access request. As the lock of the data may not be exclusive to a particular application instance, as described above, the transaction end request may also be received from another (different) application instance of the plurality of application instances.

The system in which the plurality of application instances and the database system are comprised may be a mobile communication system and the database system may be a central database system employed in the mobile communication system. The mobile communication system may comprise a cellular network, such as a 5G network, for example, and the database system may be a database system which stores session context information for UEs registered with the mobile communication system, for example. An application instance may correspond to an instance of a service in accordance with the SBA paradigm, e.g., provided in a network domain of the mobile communication system.

Figure 6:
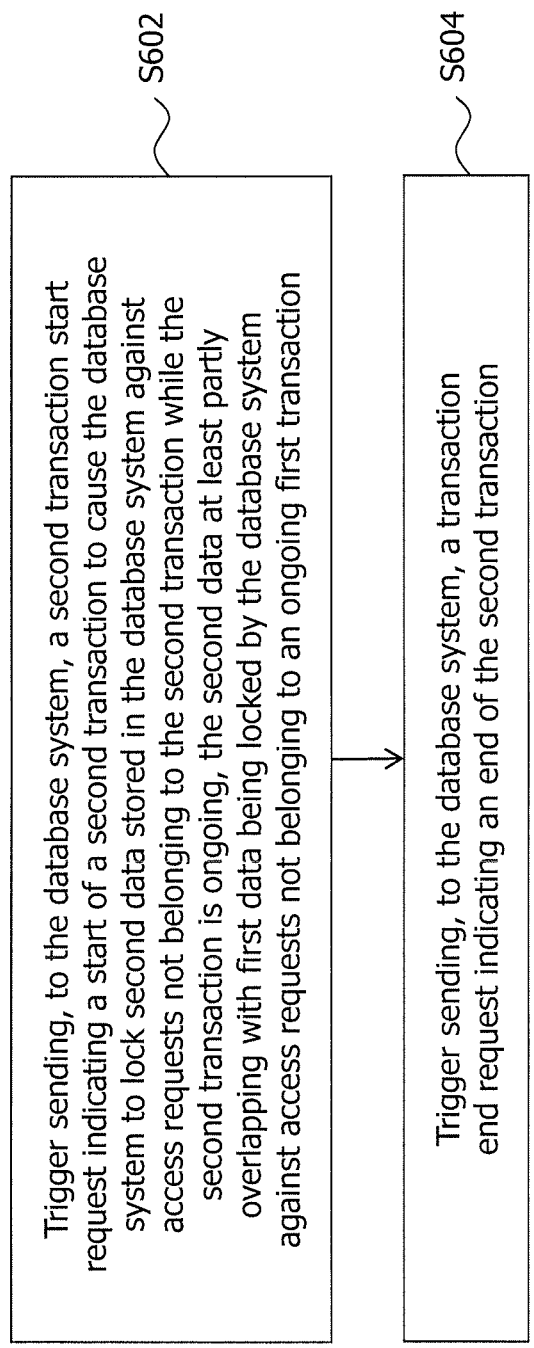
FIG. 6 illustrates a method which may be performed by the second application instance according to the present disclosure.

FIG. 6 illustrates a method which may be performed by the second application instance executed on the computing unit 410 according to the present disclosure. The method is dedicated to performing concurrency control of transactions in a system comprising a plurality of application instances accessing a database system (e.g., the database system executed on the computing unit 400). The operation of the second application instance may be complementary to the operation of the database system described above in relation to FIG. 5 and, as such, aspects described above with regard to the operation of the second application instance may be applicable to the operation of the second application instance executed on the computing unit 410 described in the following as well. Unnecessary repetitions are thus omitted in the following.

In step S602, the second application instance may trigger sending, to the database system, a second transaction start request indicating a start of a second transaction to cause the database system to lock second data stored in the database system against access requests not belonging to the second transaction while the second transaction is ongoing, the second data at least partly overlapping with first data being locked by the database system against access requests not belonging to an ongoing first transaction, wherein the second transaction start request includes a priority indication for the second transaction enabling the database system to control acceptance of access requests to the data belonging to the second transaction based on determining whether the second transaction has a higher priority than the first transaction. In step S604, the second application instance may trigger sending, to the database system, a transaction end request indicating an end of the second transaction. As described above in relation to FIG. 5, the system may be a mobile communication system and the database system may be a central database system employed in the mobile communication system.

Figure 7:
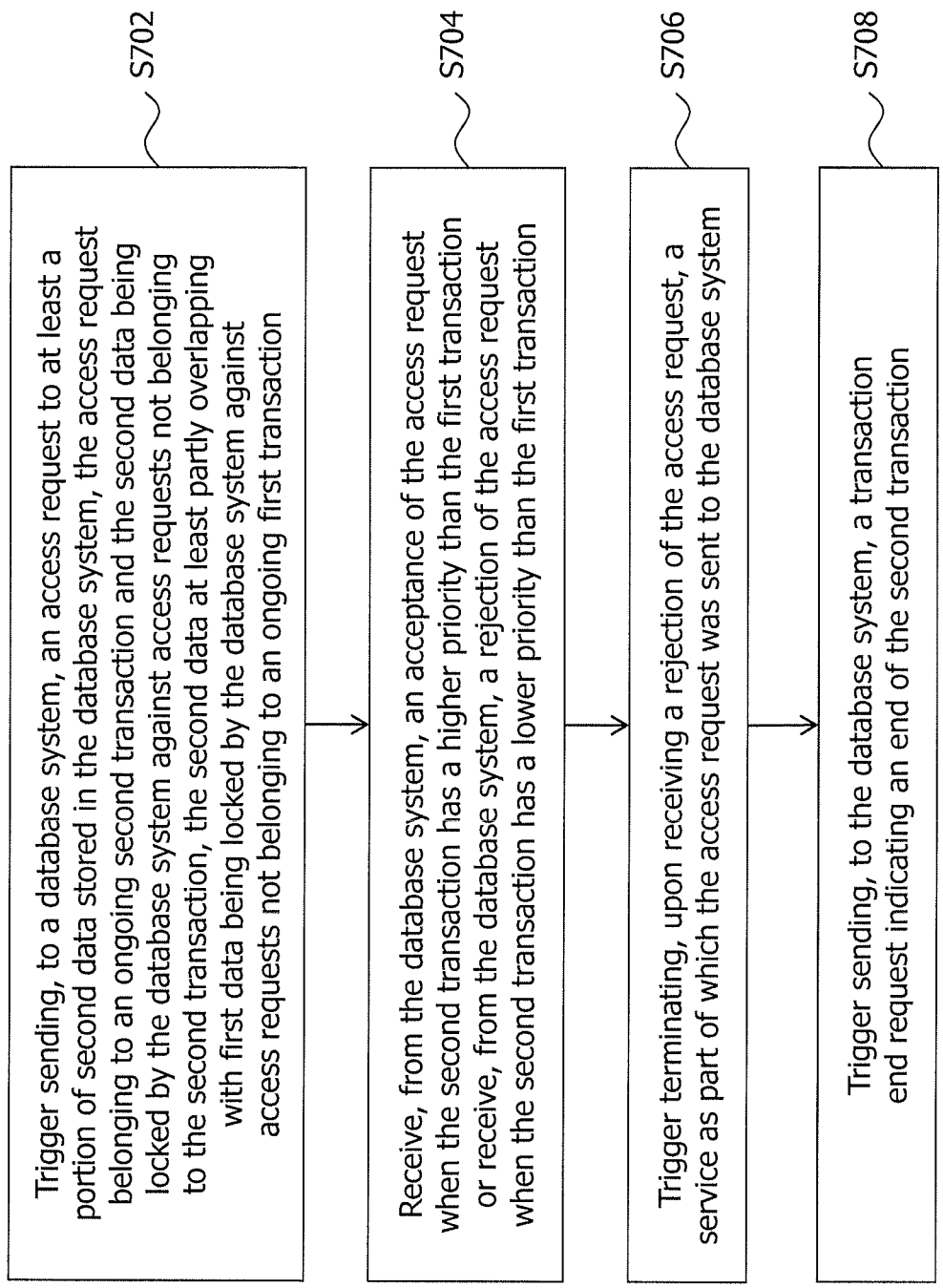
FIG. 7 illustrates a method which may be performed by the third application instance according to the present disclosure.

FIG. 7 illustrates a method which may be performed by the third application instance executed on the computing unit 420 according to the present disclosure. The method is dedicated to performing concurrency control of transactions in a system comprising a plurality of application instances accessing a database system (e.g., the database system execute on the computing unit 400). The operation of the third application instance may be complementary to the operation of the database system described above in relation to FIG. 5 and, as such, aspects described above with regard to the operation of the third application instance may be applicable to the operation of the third application instance described in the following as well. Unnecessary repetitions are thus omitted in the following.

In step S702, the third application instance may trigger sending, to the database system, an access request to at least a portion of second data stored in the database system, the access request belonging to an ongoing second transaction and the second data being locked by the database system against access requests not belonging to the second transaction, the second data at least partly overlapping with first data being locked by the database system against access requests not belonging to an ongoing first transaction. In step S704, the third application instance may either receive, from the database system, an acceptance of the access request when the second transaction has a higher priority than the first transaction or receive, from the database system, a rejection of the access request when the second transaction has a lower priority than the first transaction. In step S706, the third application instance may trigger terminating, upon receiving a rejection of the access request, a service as part of which the access request was sent to the database system. In step S708, the third application instance may trigger sending, to the database system, a second transaction end request indicating an end of the second transaction. As described above in relation to FIG. 5, the system may be a mobile communication system and the database system may be a central database system employed in the mobile communication system.

Figure 8:
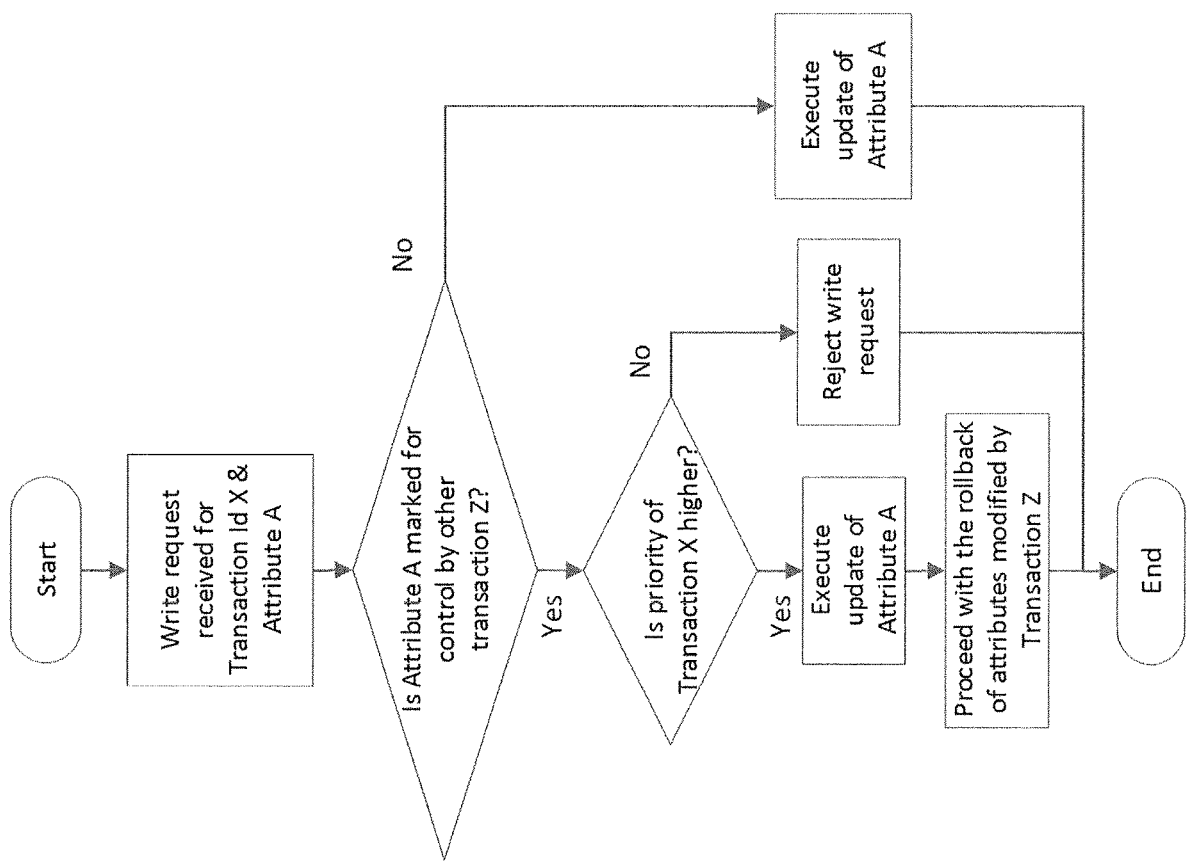
FIG. 8 illustrates a flowchart of an exemplary race condition handling method with transaction preemption or prioritization according to the present disclosure.

FIG. 8 illustrates a flowchart of an exemplary race condition handling method supporting transaction preemption or prioritization which may be performed by the database system executed on the computing unit 400 according to the present disclosure. The method may comprise receiving an access request (which in the shown example is a write request) belonging to a second transaction with identifier X attempting to access an attribute A of a record of the database system. Upon receiving the access request, the database system may check whether attribute A is a locked by another transaction (in the shown example, a first transaction with identifier Z) which may be done by checking the marking of attribute A and, if attribute A is not locked, the requested update of attribute A may be executed. If attribute A is locked by the first transaction Z, on the other hand, the database system may additionally check whether the priority of the second transaction X is higher than the priority of the first transaction Z and, if the priority of the second transaction X is higher, the requested update of attribute A may be executed and, if needed, a rollback of the first transaction Z may be performed so that all attributes which have previously been modified as part of the first transaction Z are set back to their original values at the start of the first transaction Z. If the priority of the second transaction X is not higher, on the other hand, the access request may be rejected.

Figure 9:
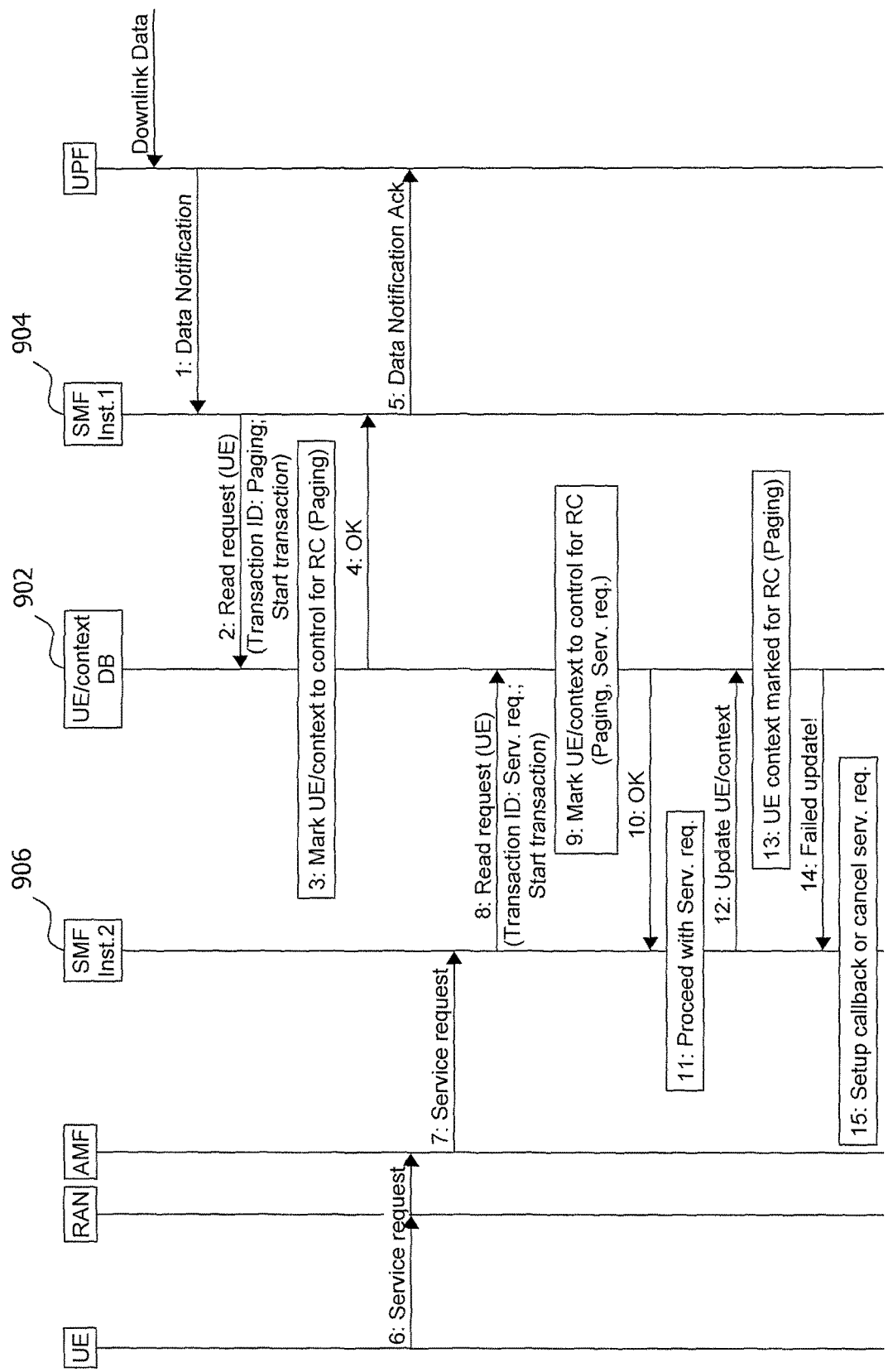
FIG. 9 illustrates a signaling diagram of an exemplary interaction between the database system, a first application instance, the second application instance and the third application instance without the transaction preemption or prioritization functionality according to the present disclosure.

FIG. 9 illustrates a signaling diagram of an exemplary interaction between the database system, the first application instance, the second application instance and the third application instance without transaction preemption or prioritization functionality according to the present disclosure. In the example of FIG. 9, the database system is denoted by reference numeral 902 and corresponds to a UE session context database of a mobile communication system, the first application instance is denoted by reference numeral 904 and corresponds to a first instance of a Session Management Function (SMF) provided in the mobile communication system, and the second application instance is denoted by reference numeral 906 and corresponds to a second instance of the SMF provided in the mobile communication system. In the following, reference will only be made to those steps in the signaling diagram which are relevant for understanding the principles of the technique presented herein.

In step 2 of the procedure, the first application instance 904 may send to the database system 902, as part of a RAN triggered paging procedure for a UE, a first transaction start request which may come in the form of a read request for the context of the UE stored in the database system 902. In step 3, the database system 902 may lock the UE context as being under control of the first transaction and may mark the UE context accordingly. In step 8 of the procedure, the second application instance 906 may similarly send to the database system 902, as part of a service request procedure triggered by the UE, a second transaction start request which may again come in the form of a read request for the UE context stored in the database system 902. In step 9, the database system 902 may mark the UE context accordingly, so that the UE context is locked by both the first transaction and the second transaction. In step 12, the application instance 906 may send an access request belonging to the second transaction to the database system 902 requesting an update the UE context (in this case, the application instance 906 acts as the "third application instance" in the sense of the present disclosure). In step 13, the database system 902 may determine that the UE context has first been locked by the first transaction and, since the first transaction is still ongoing and since in this example the transaction preemption or prioritization functionality is not in place, the database system 902 may reject the access request in step 14 due to the precedence arising from the temporal order of the first and the second transaction. As a result, in step 15, the service request may either be canceled or delayed until the paging procedure involving the first transaction terminates, for example.

Figure 3:
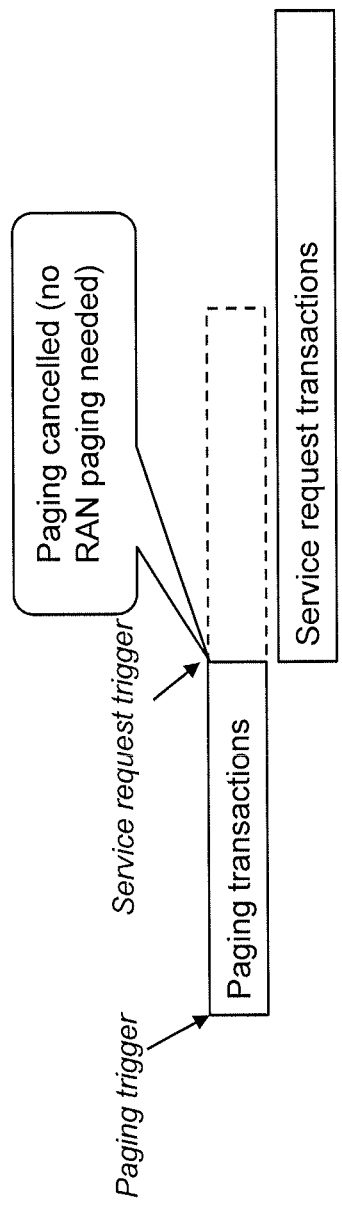
FIG. 3 illustrates an exemplary situation of service request preemption over a paging procedure relating to the same UE.
Figure 10:
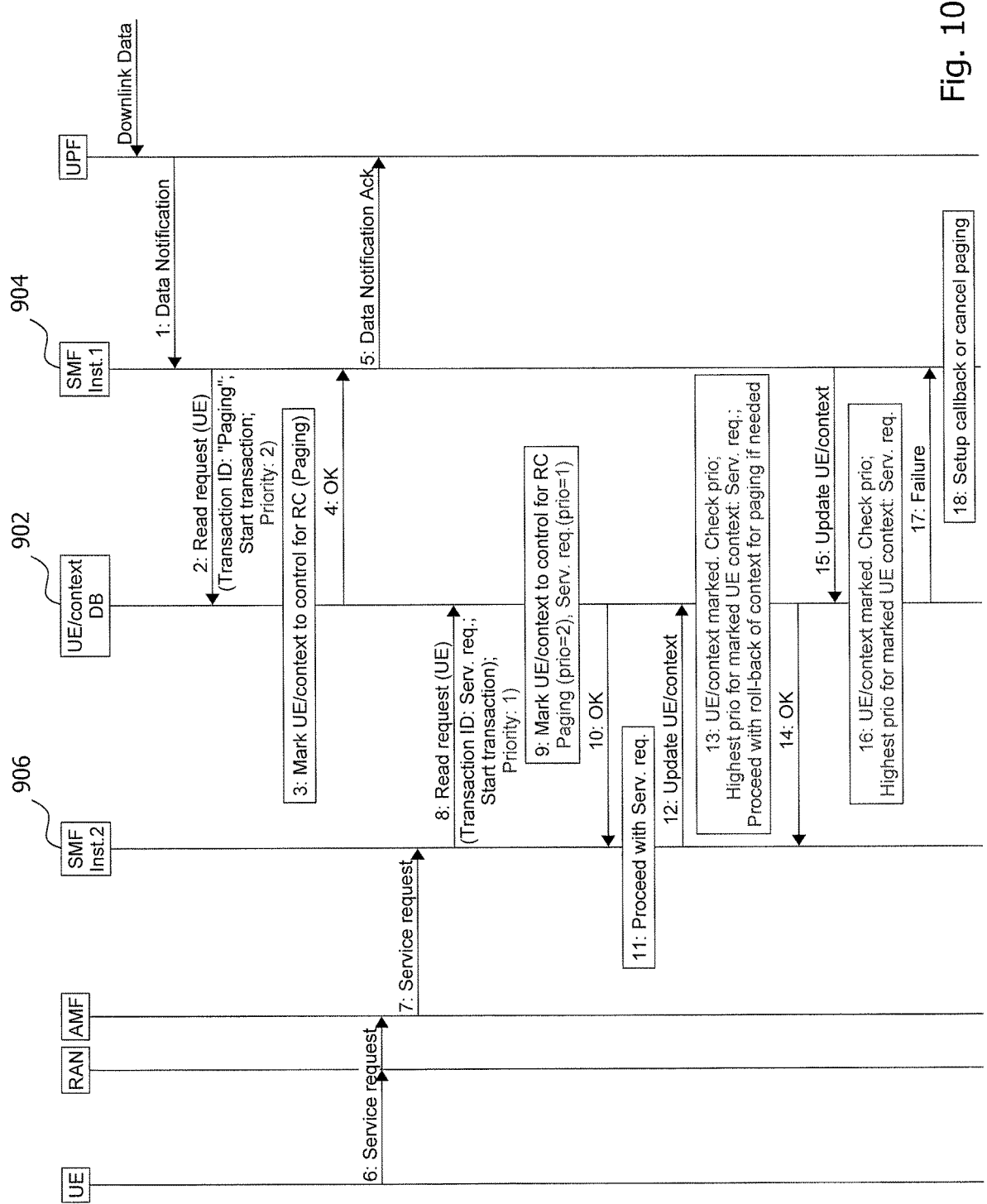
FIG. 10 illustrates the signaling diagram of FIG. 9 supplemented by exemplarily transaction preemption or prioritization functionality according to the present disclosure.

FIG. 10 illustrates another signaling diagram of an exemplary interaction between the database system, the first application instance, the second application instance and the third application instance according to the present disclosure. The signaling diagram basically corresponds to the signaling diagram of FIG. 9, the only difference being that the signaling diagram of FIG. 10 includes the above-described transaction preemption or prioritization functionality according to the present disclosure. Further to the process described in relation to FIG. 9, therefore, the first application instance 904 and the second application instance 906 may additionally include priority indications in their transaction start requests sent to the database system 902. More specifically, in the shown example, the first transaction start request associated with the paging procedure sent from the first application instance 904 to the database system 902 in step 2 may include a priority value of "2", whereas the second transaction start request associated with the service request procedure sent from the second application instance 906 to the database system 902 in step 8 may include a priority value of "1". The database system 902 may mark the UE context with these priority values accordingly. When the application instance 906 then sends an access request belonging to the second transaction to the database system 902 requesting to update the UE context (in this case, the application instance 906 again acts as the "third application instance" in the sense of the present disclosure), the database system 902 may determine that the second transaction has a higher priority than the first transaction (reflecting preemption of the service request over the paging procedure, as already described above in relation to FIG. 3) and therefore accept the access request in step 14. The database system 902 may thus make use of additional priority information to decide on which transaction to allow during the presence of race conditions. If needed, the database system 902 may trigger a rollback of the first transaction to recover any values that may have been modified during the first transaction as part of the paging procedure. Contrary to the acceptance of the access request from the second application instance 906 in step 12, an access request to the UE context from the first application instance 904 may be rejected by the database system 902 due to the lower priority value of the first transaction, as indicated by steps 15 to 17 shown in FIG. 10. As a result, in step 18, the paging procedure may be terminated, for example. While, in the above example, explicit priority indications are conveyed in the transaction start requests, it will be understood that such priority values could alternatively be inferred from information received as part of the respective transactions, as described above.

As has become apparent from the above, the present disclosure provides a technique for concurrency control of transactions in a system comprising a plurality of application instances accessing a database system. According to the presented technique, the database system may control the handling of race conditions, rather than an application instance accessing the database, and situations may therefore be avoided in which data is exclusively blocked by a single application instance throughout the completion of a whole transaction. The result of the presented race condition handling may be that data, such as a list of attributes, may effectively be protected until the transaction is finalized. Further, the presented technique may allow selecting a minimum set of attributes to be controlled by carefully selecting those attributes which may be subject to race conditions, wherein the selection may not be limited to only those attributes that are modified by the given transaction.

The technique presented herein may generally provide a fast and simple race condition handling method, which may particularly be suitable for environments in which complex multi-step transactions occur and where data contention is generally low, such as in 5G core networks, for example. As the technique presented herein may pose limited design constraints on the application logic of services performing the database updates, the technique may form a candidate for a standard solution in multi-vendor environments. The application instances themselves may not be required to take care of the race condition handling because this logic may essentially be placed in the database. Apart from write access requests, read access requests of the involved data may always be granted for parallel transactions during the execution of the ongoing transaction.

Further, requests within the ongoing transaction may generally be performed by different instances (of the same or different services) which have access to the same data, with the only requirement that a transaction identifier may be needed to be included into the access requests. The lock may thus not be exclusive to an application instance but rather to the transaction itself. In other words, every other application instance that shares the same data may perform writes, provided that it belongs to the same transaction. Any service instance within a set or pool of instances of the same service type may access the database under a relatively easy management of race conditions. This may even simplify aspects such as routing and load balancing in the system, for example.

Moreover, the technique presented herein may ensure that always transactions that have higher priority are performed first so that the completion time for these transactions generally remains low, thereby improving system performance in case of race conditions and optimizing corresponding processing and signaling. The proposed technique may provide a solution to prioritize Multimedia Priority Services (MPS), emergency calls as well as any signaling related to mission critical applications in case of race conditions, for example. The value of the presented technique may generally increase as the number of potential service instances accessing the same data increases, which is a general trend in the telecommunication and IT industry with the adherence to cloud native principles where functionality is typically divided in small pieces, such as microservices.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for concurrency control of transactions in a system comprising a plurality of application instances accessing a database system, the method being performed by the database system and comprising:

receiving a first transaction start request indicating a start of a first transaction to lock first data stored in the database system against access requests not belonging to the first transaction while the first transaction is ongoing;

receiving a second transaction start request indicating a start of a second transaction to lock second data stored in the database system against access requests not belonging to the second transaction while the second transaction is ongoing, the second data at least partly overlapping with the first data;

receiving an access request to at least a portion of the second data that overlaps with the first data while the first transaction and the second transaction are ongoing, the access request belonging to the second transaction;

controlling acceptance of the access request based on determining whether the second transaction has a higher priority than the first transaction, wherein determining whether the second transaction has a higher priority than the first transaction includes:

inferring a priority value for the first transaction based on information received as part of the first transaction and inferring a priority value for the second transaction based on information received as part of the second transaction; and checking whether the priority value of the second transaction is hither than the priority value of the first transaction.

2. The method of claim 1, wherein controlling acceptance of the access request includes one of:

accepting the access request when the second transaction has a higher priority than the first transaction, and rejecting the access request when the second transaction has a lower priority than the first transaction.

3. The method of claim 1, wherein the first transaction start request includes a priority indication for the first transaction and the second transaction start request includes a priority indication for the second transaction, wherein determining whether the second transaction has a higher priority than the first transaction includes checking whether the priority indication of the second transaction has a higher priority than the priority indication of the first transaction.

4. The method of claim 3, wherein locking the first data includes marking the first data by the priority indication of the first transaction and wherein locking the second data includes marking the second data by the priority indication of the second transaction, wherein, prior to determining whether the second transaction has a higher priority than the first transaction, the priority indication of the first transaction and the priority indication of the second transaction are retrieved based on the marking of the at least a portion of the second data to be accessed by the access request.

5. The method of claim 1, wherein each of the information received as part of the first transaction and the information received as part of the second transaction includes at least one of:

a transaction identifier of the respective transaction, a transaction name of the respective transaction, data being accessed as part of the respective transaction, a type of request being performed as part of the respective transaction, and a type of service as part of which the respective transaction is performed.

6. The method of claim 1, wherein inferring the priority value of the first transaction and inferring the priority value of the second transaction is performed based on a predetermined configuration of the database system.

7. The method of claim 1, further comprising:

tracking modifications applied to the first data in response to access requests performed as part of the first transaction; and rolling back the first transaction based on the tracked modifications when it is determined that second transaction has a higher priority than the first transaction.

8. The method of claim 1, wherein the system is a mobile communication system and the database system is a central database system employed in the mobile communication system.

9. A method for concurrency control of transactions in a system comprising a plurality of application instances accessing a database system, the method being performed by an application instance of the plurality of application instances and comprising:

triggering sending, to the database system, a second transaction start request indicating a start of a second transaction to cause the database system to lock second data stored in the database system against access requests not belonging to the second transaction while the second transaction is ongoing, the second data at least partly overlapping with first data being locked by the database system against access requests not belonging to an ongoing first transaction, wherein the second transaction start request includes a priority indication for the second transaction enabling the database system to control acceptance of access requests to the data belonging to the second transaction based on determining whether the second transaction has a higher priority than the first transaction, wherein determining whether the second transaction has a higher priority than the first transaction includes:

inferring a priority value for the first transaction based on information received as part of the first transaction and inferring a priority value for the second transaction based on information received as part of the second transaction; and checking whether the priority value of the second transaction is higher than the priority value of the first transaction.

10. The method of claim 9, wherein the system is a mobile communication system and the database system is a central database system employed in the mobile communication system.

11. A method for concurrency control of transactions in a system comprising a plurality of application instances accessing a database system, the method being performed by an application instance of the plurality of application instances and comprising:

triggering sending, to the database system, an access request to at least a portion of second data stored in the database system, the access request belonging to an ongoing second transaction and the second data being locked by the database system against access requests not belonging to the second transaction, the second data at least partly overlapping with first data being locked by the database system against access requests not belonging to an ongoing first transaction, and inferring a priority value for the first transaction based on information received as part of the first transaction and inferring a priority value for the second transaction based on information received as part of the second transaction.

12. The method of claim 11, further comprising one of:
receiving, from the database system, an acceptance of the access request when the second transaction has a higher priority than the first transaction, and
receiving, from the database system, a rejection of the access request when the second transaction has a lower priority than the first transaction.

13. The method of claim 12, further comprising:
triggering terminating, upon receiving a rejection of the access request, a service as part of which the access request was sent to the database system.

14. The method of claim 11, wherein the system is a mobile communication system and the database system is a central database system employed in the mobile communication system.

15. A computer program product comprising program code portions for performing the method of claim 1 when the computer program product is executed on one or more computing devices.

16. The computer program product of claim 15, stored on a computer readable recording medium.

17. A computing unit configured to execute a database system for concurrency control of transactions in a system comprising a plurality of application instances accessing the database system, the computing unit comprising at least one processor and at least one memory, the at least one memory containing instructions executable by the at least one processor such that the database system is operable to perform the method of claim 1.

18. A computing unit configured to execute an application instance for concurrency control of transactions in a system comprising a plurality of application instances accessing a database system, the computing unit comprising at least one processor and at least one memory, the at least one memory containing instructions executable by the at least one processor such that the application instance is operable to perform the method of claim 9.

19. A computing unit configured to execute an application instance for concurrency control of transactions in a system comprising a plurality of application instances accessing a database system, the computing unit comprising at least one processor and at least one memory, the at least one memory containing instructions executable by the at least one processor such that the application instance is operable to perform the method claim 11.

\* \* \* \* \*